Patented June 11, 1929.

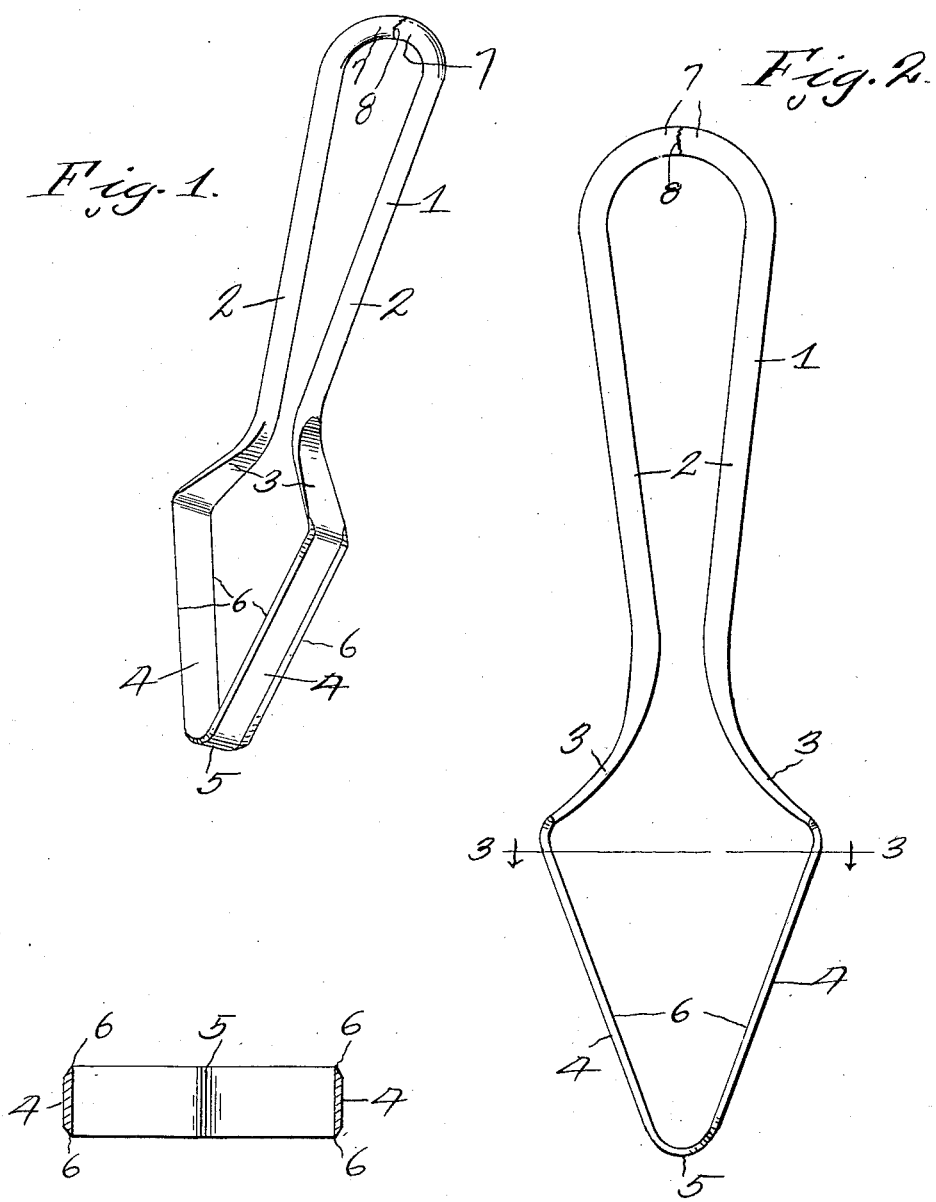

1,716,841

UNITED STATES PATENT OFFICE.

HERMAN STONE, OF GREELEY, COLORADO.

WEEDING TOOL.

Application filed March 11, 1926. Serial No. 93,939.

The invention relates to weeding tools particularly adapted for weeding onions, and has for its object to provide a device of this character comprising a U-shaped handle, the arms of which are connected together by a V-shaped cutter blade in reverse relation to the handle member, and substantially triangular shaped whereby a weeding operation may be accomplished relatively close to a plant, which is made possible by the triangular shape of the blade.

A further object is to form the handle member and blade from a single piece of material, preferably round material which may be flattened when in the form of a straight rod and its opposite edges sharpened and then bent to form so that the ends of the rod will form the handle member which may be easily welded together.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the weeding tool.

Figure 2 is a front elevation of the weeding tool.

Figure 3 is a horizontal sectional view taken on line 3—3 of Figure 2.

Referring to the drawing, the numeral 1 designates the U-shaped handle member of the tool, the arms 2 of which extend downwardly and converge and terminate in downwardly and outwardly inclined flattened portions 3, the ends of which terminate in downwardly converging blades 4 which are connected together at 5. The edges of the portions 4 are sharpened as at 6 whereby during a weeding operation when the operator grasps the handle member 1, the triangular shaped blade will easily pass through the dirt for severing a weed at a point below the ground or passing entirely under the weed so it can be dislodged. By providing the triangularly shaped blade, it is obvious the operator can manipulate the same relatively close to a plant, for instance an onion plant, which is made possible by the particular shape of the blade.

The device is preferably formed from a single piece of rod material which is first, while in a straight condition, flattened and sharpened intermediate its end, after which the device is bent to form over a form and the rod ends 7 welded together at 8, therefore it will be seen that the device may be cheaply manufactured and sold. By converging the arms 2 the handle member can be positively gripped by the operator while using the device and by having the arms 2 spaced, it is obvious the upper portion of a plant may pass therebetween where it can be easily held by the operator, for instance where the device is used for transplanting small plants, and at which time the dirt will be held with the plant within the triangular blade and the triangular blade can be forced downwardly into the ground for forming a hole and the blade can then be removed from under the plant for leaving the plant in the hole formed by the blade when forced into the ground.

From the above it will be seen that a garden tool is provided, particularly adapted for weeding onions which is simple in construction, positive in its operation and one wherein a weeding operation may be accomplished relatively close to a plant.

The invention having been set forth what is claimed as new and useful is:—

A weeding device comprising a U-shaped handle member and a triangular shaped blade carried by the arms of the U-shaped handle member, the arms of the U-shaped handle member being round and the passage between the arms of the U-shaped handle member being in communication with the chamber of the triangular shaped blade and forming means whereby a plant may pass between the arms of the handle member without damage to the plant and for the entire length of the handle member and triangular shaped blade.

In testimony whereof I hereunto affix my signature.

HERMAN STONE.